US011126914B2

(12) United States Patent
Thibault et al.

(10) Patent No.: US 11,126,914 B2
(45) Date of Patent: Sep. 21, 2021

(54) IMAGE GENERATION USING MACHINE LEARNING

(71) Applicants: General Electric Company, Schenectady, NY (US); Purdue University, West Lafayette, IN (US); Notre Dame University, Notre Dame, IN (US)

(72) Inventors: Jean-Baptiste Thibault, Waukesha, WI (US); Somesh Srivastava, Waukesha, WI (US); Jiang Hsieh, Brookfield, WI (US); Charles A. Bouman, Jr., West Lafayette, IN (US); Dong Ye, West Lafayette, IN (US); Ken Sauer, Notre Dame, IN (US)

(73) Assignees: GENERAL ELECTRIC COMPANY, Schenectady, NY (US); PURDUE UNIVERSITY, West Lafayette, IN (US); NOTRE DAME UNIVERSITY, Notre Dame, IN (US)

(*) Notice: Subject to any disclaimer, the term of this patent is extended or adjusted under 35 U.S.C. 154(b) by 995 days.

(21) Appl. No.: 15/730,543

(22) Filed: Oct. 11, 2017

(65) Prior Publication Data
US 2019/0108441 A1  Apr. 11, 2019

(51) Int. Cl.
*G06N 3/08* (2006.01)
*G06T 11/00* (2006.01)
(Continued)

(52) U.S. Cl.
CPC ............ *G06N 3/08* (2013.01); *G01N 23/046* (2013.01); *G06N 20/00* (2019.01); *G06T 11/003* (2013.01);
(Continued)

(58) Field of Classification Search
CPC ........ G06N 3/08; G06N 20/00; G06N 99/005; G01N 23/046; G01N 2223/419;
(Continued)

(56) References Cited

U.S. PATENT DOCUMENTS

| 2006/0210131 A1* | 9/2006 | Wheeler, Jr. .......... G06T 11/008 382/128 |
| 2013/0121553 A1* | 5/2013 | Thibault ............... G06T 11/006 382/131 |

(Continued)

OTHER PUBLICATIONS

Soons et al., "A Method of Generating an Enhanced Tomographic Image of an Object", EP 3 447 721 A1, filing date: Aug. 24, 2017. (Year: 2017).*

(Continued)

*Primary Examiner* — Dave Misir
(74) *Attorney, Agent, or Firm* — Fletcher Yoder, P.C.

(57) ABSTRACT

The present approach relates to the training of a machine learning algorithm for image generation and use of such a trained algorithm for image generation. Training the machine learning algorithm may involve using multiple images produced from a single set of tomographic projection or image data (such as a simple reconstruction and a computationally intensive reconstruction), where one image is the target image that exhibits the desired characteristics for the final result. The trained machine learning algorithm may be used to generate a final image corresponding to a computationally intensive algorithm from an input image generated using a less computationally intensive algorithm.

19 Claims, 7 Drawing Sheets

(51) Int. Cl.
  *G01N 23/046* (2018.01)
  *G06N 20/00* (2019.01)
(52) U.S. Cl.
  CPC ...... *G06T 11/008* (2013.01); *G01N 2223/419* (2013.01); *G06T 2207/10072* (2013.01); *G06T 2207/20084* (2013.01); *G06T 2211/421* (2013.01); *G06T 2211/424* (2013.01)
(58) Field of Classification Search
  CPC .............. G06T 11/003; G06T 11/008; G06T 2207/10072; G06T 2207/20084; G06T 2211/421; G06T 2211/424
  USPC .......................................................... 706/25
  See application file for complete search history.

(56) References Cited

U.S. PATENT DOCUMENTS

| | | | | |
|---|---|---|---|---|
| 2016/0163073 | A1* | 6/2016 | Grass | G06T 11/006 382/131 |
| 2017/0024634 | A1* | 1/2017 | Miao | G06N 3/04 |
| 2017/0061654 | A1* | 3/2017 | Litvin | A61B 6/482 |
| 2017/0337713 | A1* | 11/2017 | Hoelzer | G06T 11/003 |
| 2018/0018757 | A1* | 1/2018 | Suzuki | A61B 6/03 |
| 2019/0104940 | A1* | 4/2019 | Zhou | G06T 11/008 |
| 2019/0325621 | A1* | 10/2019 | Wang | A61B 6/037 |

OTHER PUBLICATIONS

Chen et al., "Low-Dose CT With a Residual Encoder-Decoder Convolutional Neural Network", IEEE Transactions on Medical Imaging, vol. 36, No. 12, Date of Publication: Jun. 13, 2017. (Year: 2017).*
Gu et al., "Multi-Scale Wavelet Domain Residual Learning for Limited-Angle CT Reconstruction", Mar. 4, 2017. (Year: 2017).*
Lee et al., "Deep Residual Learning for Compressed Sensing MRI", IEEE, Apr. 2017. (Year: 2017).*
Ye et al., "Deep Residual Learning for Model-Based Iterative CT Reconstruction Using Plug-And-Play Framework", IEEE, Apr. 2018. (Date precludes usage). (Year: 2018).*
Wang, "A Perspective on Deep Imaging", IEEE Access, Jan. 2017. (Year: 2017).*
Jin et al., "Deep Convolutional Neural Network for Inverse Problems in Imaging", IEEE Transactions On Image Processing, vol. 26, No. 9, Sep. 2017. (Year: 2017).*
Soons et al., "A Method of Generating an Enhanced Tomographic Image of an Object", EP 3 447 721 A1, filing date: Aug. 24, 2017. (Previously supplied). (Year: 2017).*
Chen et al., "Low-Dose CT With a Residual Encoder-Decoder Convolutional Neural Network", IEEE Transactions on Medical Imaging, vol. 36, No. 12, Date of Publication: Jun. 13, 2017. (Previously supplied). (Year: 2017).*
Gu et al., "Multi-Scale Wavelet Domain Residual Learning for Limited-Angle CT Reconstruction", Mar. 4, 2017. (Previously supplied). (Year: 2017).*
Lee et al., "Deep Residual Learning for Compressed Sensing MRI", IEEE, Apr. 2017. (Previously supplied). (Year: 2017).*
Ye et al., "Deep Residual Learning for Model-Based Iterative CT Reconstruction Using Plug-And-Play Framework", IEEE, Apr. 2018. (Date precludes usage). (Previously supplied). (Year: 2018).*
Wang, "A Perspective on Deep Imaging", IEEE Access, Jan. 2017. (Previously supplied) (Year: 2017).*
Jin et al., "Deep Convolutional Neural Network for Inverse Problems in Imaging", IEEE Transactions on Image Processing, vol. 26, No. 9, Sep. 2017. (Previously supplied). (Year: 2017).*
Kang, Eunhee, et al.; "A Deep Convolutional Neural Network Using Directional Wavelets for Low-Dose X-Ray CT Reconstruction", Bio Imaging and Signal Processing Lab., Dept of Bio and Brain Engineering, Republic of Korea, 2016, pp. 1-32.
Chen, Hu, et al.; "Low-Dose CT Denoising with Convolutional Neural Network", IEEE International Symposium on Biomedical Imaging, pp. 143-146, Apr. 2017.
Chen, Hu, et al.; "Low-Dose CT with a Residual Encoder-Decode Convolutional Neural Network", IEEE Transactions on Medical Imaging, vol. PP, Issue 99, pp. 2524-2535, Jun. 2017.
Kang, Eunhee, et al.; "Wavelet Domain Residual Network (WavResNet) for Lose-Dose X-Ray CT Reconstruction", pp. 1-5, 2017.
Wolterink, Jelmer M., et al.; "Generative Adversarial Networks for Noise Recution in Low-Dose CT", IEEE Transactions on Medical Imaging, vol. PP, Issue 99, pp. 2536-2545, 2017.
Cheng, Lishui, et al.; "Accelerated Iterative Image Reconstruction Using a Deep Learning Based Leapfrogging Strategy", 14th International meeting on Fully Three-Dimensional Image Reconstruction in Radiology and Nuclear Medicine, p. 715-720, Jun. 18-23, 2017.

* cited by examiner

IMAGE GENERATION USING MACHINE LEARNING

BACKGROUND

The subject matter disclosed herein relates to tomographic reconstruction, and in particular to the use of deep learning techniques to reconstruct data, such as projection or other scan-type data, into diagnostically or clinically useful images, including cross-sectional images and/or volumetric representations.

Non-invasive imaging technologies allow images of the internal structures or features of a patient/object to be obtained without performing an invasive procedure on the patient/object. Such non-invasive imaging technologies rely on various physical principles (such as the differential transmission of X-rays through the target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

Reconstruction algorithms are subject to various trade-offs, such as between computational efficiency, patient dose, scanning speed, image quality, and artifacts. For example, conventional reconstruction techniques typically use reconstruction algorithms that can either be characterized as direct reconstruction (which execute an explicit inversion step) or as optimization-based reconstruction (which iteratively optimize a cost function). Direct reconstruction approaches are relatively fast but lack an efficient way to suppress noise and certain artifacts. Optimization-based reconstruction approaches offer improved noise reduction and can incorporate physics effects in the forward model that are not easily inverted analytically. Such approaches can significantly outperform direct reconstruction methods in terms of overall image quality and artifact reduction, but are relatively computationally expensive.

By way of example, one type of optimization-based reconstruction is a model-based image reconstruction (MBIR) that is an iterative approach that has reduced noise levels and improved resolution of image detail relative to conventional backprojection techniques (e.g., conventional direct reconstruction approaches). MBIR replaces the single-pass transformation of a set of data into the calculation of an image estimate subject to an algorithmic optimization that is iteratively applied. Full MBIR outperforms conventional backprojection but also stands out from other simplified statistical image estimation approaches (e.g. ASiR, AIDR, SAFIRE, and other statistical iterative techniques) in so far as it models the scanning system, acquisition physics, data statistics, and the object to be reconstructed as accurately as possible to produce the best available image reconstruction results.

However, the solution of the optimization problem posed by MBIR imposes a great computational cost on the inversion process relative to simpler techniques. Iterative methods repeatedly refine an existing estimate of the image estimate at each cycle, computing in some form a forward- and backprojection as modeled by a forward projection operator, which can be expensive computationally and also in terms of the needed hardware.

BRIEF DESCRIPTION

In one embodiment, a method for training a machine learning algorithm is provided. In accordance with this method, projection data or image data acquired using a tomographic system or systems is accessed. A plurality of image pairs are generated. Each image pair comprises a first image generated using a first algorithm and a second image generated using a second algorithm. For each respective image pair the first algorithm and the second algorithm are applied to the same projection or image data. The machine learning algorithm is trained using the plurality of image pairs to emulate the characteristics of the second algorithm.

In a further embodiment, an image processing system is provided. In accordance with this embodiment, the image processing system includes: a memory storing one or more processor-executable routines; and a processing component configured to communicate with the memory and execute the one or more processor-executable routines. The one or more processor executable routines, when executed, cause the processor to: generate a first image by applying a first algorithm to a set of tomographic scan data or access the first image from a storage medium; and provide the first image as an input to a machine learning algorithm trained to generate an output image corresponding to application of a second algorithm to the set of tomographic scan data.

In an additional embodiment, a method for image reconstruction is provided. In accordance with this method a first image is generated by applying a first algorithm to a set of tomographic scan data or accessing the first image from a storage medium. The first image is provided as an input to a machine learning algorithm trained to generate an output image corresponding to application of a second algorithm to the set of tomographic scan data.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

While aspects of the following discussion are provided in the context of medical imaging, it should be appreciated that the present techniques are not limited to such medical contexts. Indeed, the provision of examples and explanations in such a medical context is only to facilitate explanation by providing instances of real-world implementations and applications. However, the present approaches may also be utilized in other contexts, such as tomographic image reconstruction for industrial Computed Tomography (CT) used in non-destructive inspection of manufactured parts or goods (i.e., quality control or quality review applications), and/or the non-invasive inspection of packages, boxes, luggage, and so forth (i.e., security or screening applications). In general, the present approaches may be useful in any imaging or screening context or image processing field where a set or type of acquired data undergoes a reconstruction process to generate an image or volume.

Furthermore, while the following discussion focuses on standard images or image volumes, it should be understood that the same approach can also be applied to sets of images or image volumes corresponding to different aspects of the scan. For example, spectral CT produces a set of images, including monochromatic images at different energies as well as basis material decomposition images. Or as another example, dynamic CT or PET produces a set of images at different time points. The current invention may be applied to these sets or types of temporally offset images.

Further, though CT and C-arm examples are primarily provided herein, it should be understood that the present approach may be used in other imaging modality contexts where tomographic reconstruction processes are employed. For instance, the presently described approach may also be employed on data acquired by other types of tomographic scanners including, but not limited to, positron emission tomography (PET) scanners, single photon emission computed tomography (SPECT) scanners, and/or magnetic resonance imaging (MM) scanners.

By way of example, several imaging modalities, such as X-ray CT (e.g., multi-slice CT) and X-ray C-arm systems (e.g., cone-beam CT), measure projections of the object or patient being scanned where the projections, depending on the technique, correspond to Radon transform data, fan-beam transform data, cone-beam transform data, or non-uniform Fourier transforms. In other contexts, the scan data may be emission type data (e.g., PET or SPECT data) or magnetic resonance data (e.g., MM data) generated in response to magnetic fields and RF pulses. Tomographic reconstruction algorithms and related correction and calibration algorithms (e.g., partial volume correction, noise suppression, beam hardening artifact correction, X-ray source/detector spectral calibration, low-signal correction, scatter correction, motion correction, truncation correction, MR white pixel correction, MR field inhomogeneity artifact correction, and so forth) are employed in conjunction with these imaging modalities to generate useful cross-sectional images or volumetric images from raw measurements.

Conventional reconstruction techniques typically use reconstruction algorithms that can either be characterized as direct reconstruction (which execute an explicit inversion step) or as optimization-based reconstruction (which iteratively optimize a cost function). Direct reconstruction approaches are relatively fast but lack an efficient way to suppress noise and certain artifacts. Optimization-based reconstruction approaches offer improved noise reduction and can incorporate physics effects in the forward model that are not easily inverted analytically, but such approaches are relatively computationally expensive.

By way of example, model-based image reconstruction (MBIR) techniques are an optimization-based approach that provide reduced noise levels and improved resolution of image details compared to conventional backprojection approaches (i.e., direct reconstruction). MBIR replaces the single-pass transformation of a set of data y into the iterative calculation of an image estimate x in accordance with an optimization formulation:

$$\hat{x} = \arg\min_x \{\|y - F(x,\theta)\| + S(x)\}. \quad (1)$$

where F is a forward projection operator that mimics the scanner's conversion of the image x under system parameterization by vector $\theta$ and S is a penalty function encouraging image characteristics such as local smoothness that are part of probabilistic image models. Arbitrary system geometry can be modeled in F, and varying reliability of data can be included in the norm on the error between y and the forward projection of x.

As may be appreciated, solving the optimization problem posed by MBIR imposes a great computational cost on the inversion process. In particular, iterative methods repeatedly refine an existing estimate of x, at each cycle computing, in some form, a forward- and backprojection as modeled by the operator F, which imposes substantial computational expense to such a reconstruction process.

MBIR is provided herein as an example of a computationally intensive process that may be suitable target reconstruction algorithm for emulation in a more direct and computationally practical manner. Other examples of computationally intensive algorithms whose effects can be emulated include, but are not limited to, applying algorithms to implement one or more or metal artifact reduction, applying low signal artifact reduction or beam hardening artifact reduction, scatter correction, image texture optimization, sparse reconstruction, and other techniques which typically prove computationally challenging. Thus, though MBIR is discussed so as to facilitate explanation in the context of a real-world example, it should be appreciated that the present approach may be applied to any suitable computationally intensive target algorithm. In particular, it should be appreciated that certain examples discussed herein to facilitate explanation relate to image reconstruction (e.g., the reconstructing an image or volume from projection or other acquisition data). However, the present approach should more broadly be understood as encompassing generation not only of reconstructed images, but any image generation that may conventionally be understood to result from the application of computationally intensive algorithms, such as artifact correction algorithms, examples of which are provided above. That is, the present approach may generally be understood as encompassing not just reconstruction of images from acquisition data that have the appearance of a more complex target algorithm than what was performed, but also the generation of images having the appearance of having been generated using a computationally intensive algorithm (e.g., an artifact or noise reduction algorithm) despite such an algorithm not having been implemented.

With this in mind, the present approach relates to the use of machine learning to provide a reconstruction having desired image quality characteristics that are typically obtained using a computationally intensive algorithm with substantially reduced computational requirements or overhead. As used herein, machine learning should be understood to correspond to a set of algorithms that build non-linear statistical models from sample datasets for the purposes of data-driven predictions.

By way of example, some embodiments of the machine learning approaches described herein utilize neural networks as part of the reconstruction process used to generate tomographic images, such as CT, PET, SPECT, C-arm, phase-contrast, and MR images. Neural networks as discussed herein may encompass deep neural networks, fully connected networks, convolutional neural networks (CNNs), perceptrons, auto encoders, recurrent networks, or other learning network architectures. These techniques are referred to herein as machine learning or deep learning techniques, though this terminology may also be used specifically in reference to the use of deep neural networks, which is a neural network having a plurality of layers.

As discussed herein, deep learning techniques (which may also be known as deep machine learning, hierarchical learning, or deep structured learning) are a branch of machine learning techniques that employ mathematical representations of data and artificial neural network for learning. By way of example, machine learning approaches may be characterized by their use of one or more algorithms to extract or model high level abstractions of a type of data of interest by way of intensive computations requiring computer hardware. Deep learning may be accomplished using one or more processing layers, with each layer typically corresponding to a different level of abstraction and, therefore potentially employing or utilizing different aspects of the initial data or outputs of a preceding layer (i.e., a hierarchy or cascade of layers) as the target of the processes or algorithms of a given layer. In an image processing or reconstruction context, this may be characterized as different layers corresponding to the different feature levels or resolution in the data.

In general, the processing from one representation space to the next-level representation space can be considered as one 'stage' of the reconstruction process. Each stage of the reconstruction can be performed by separate neural networks or by different parts of one larger neural network. For example, as discussed herein, a single deep learning network may cover all stages in a reconstruction process (e.g., from an initial input (such as a sinogram) to an output image (such as a reconstructed image)). Alternatively, separate distinct deep learning network(s) may each cover only one stage (or a subset of stages) of the overall reconstruction process.

As discussed herein, as part of the initial training of deep learning processes to solve a particular problem, training data sets may be employed that have known initial values (e.g., input images, projection data, emission data, magnetic resonance data, an analytic or direct reconstruction image, and so forth) and known or desired values for a final output (e.g., iteratively reconstructed tomographic reconstructions, residual or difference images, and so forth) of the deep learning process. The training of a single stage may have known input values corresponding to one representation space and known output values corresponding to a next-level representation space. In this manner, the deep learning algorithms may process (either in a supervised or guided manner or in an unsupervised or unguided manner) the known or training data sets until the mathematical relationships between the initial data and desired output(s) are discerned and/or the mathematical relationships between the inputs and outputs of each layer are discerned and characterized. Similarly, separate validation data sets may be employed in which both the initial and desired target values are known, but only the initial values are supplied to the trained deep learning algorithms, with the outputs then being compared to the outputs of the deep learning algorithm to validate the prior training and/or to prevent over-training.

As discussed herein, the present machine learning approach includes training a convolutional neural network to generate one or both of a difference (i.e., residual) image or an iterative reconstruction image (e.g., an MBIR image, and artifact-corrected image, or generally a desired image) from a direct (i.e., analytical, or simplified) reconstruction image, which is generally not computationally intensive to generate. That is, machine learning approaches are used to predict a residual or iterative reconstruction image from an analytically reconstructed image, such as a filtered backprojection, without reference back to the original sinogram (i.e., projection) data and in an elapsed time that is less than required to generate an iterative reconstruction conventionally. Unlike other training schemes in a tomographic context, the present approach trains a deep network using multiple images produced from a single set of tomographic projection data, where one image is the target image that exhibits the desired characteristics for the final result. For example, training may be accomplished using a filtered backprojection image (i.e., the input image) and a MBIR image (i.e., the target image) reconstructed from a single set of tomographic projection data (i.e., the same projection data). In this manner, the machine learning algorithms are trained to generate images with the characteristics of a target algorithm (e.g., an iterative reconstruction algorithm) from an image reconstructed with a different algorithm (e.g., a filtered backprojection or other analytic or direct reconstruction algorithm).

In this manner, once the proper training is accomplished (as discussed in greater detail herein) use of a trained machine learning algorithm on the output of a simple reconstruction to emulate the characteristics of a target reconstruction algorithm, like MBIR, may provide various benefits. Such benefits include, but are not limited to: generating a MBIR-quality reconstruction in milliseconds as opposed to minutes; producing more consistent and pleasing image texture relative to conventional MBIR; and/or avoiding artifacts with a signature unique to MBIR, such as image degradations due to sampling challenges or patient motion. In addition, the present machine learning approaches are extendible to other algorithms or target image results other than MBIR that require advanced processing, such as metal artifact reduction, sparse view reconstruction, and so forth.

Prior to discussing the present approach in greater detail, a high level overview of an artificial neural network that may be used in implementing a machine learning image reconstruction as discussed herein, and of an imaging system that may be used to generate data to be reconstructed in accordance with the present approach are provided to provide useful context and introduce relevant terminology.

Figure 1:
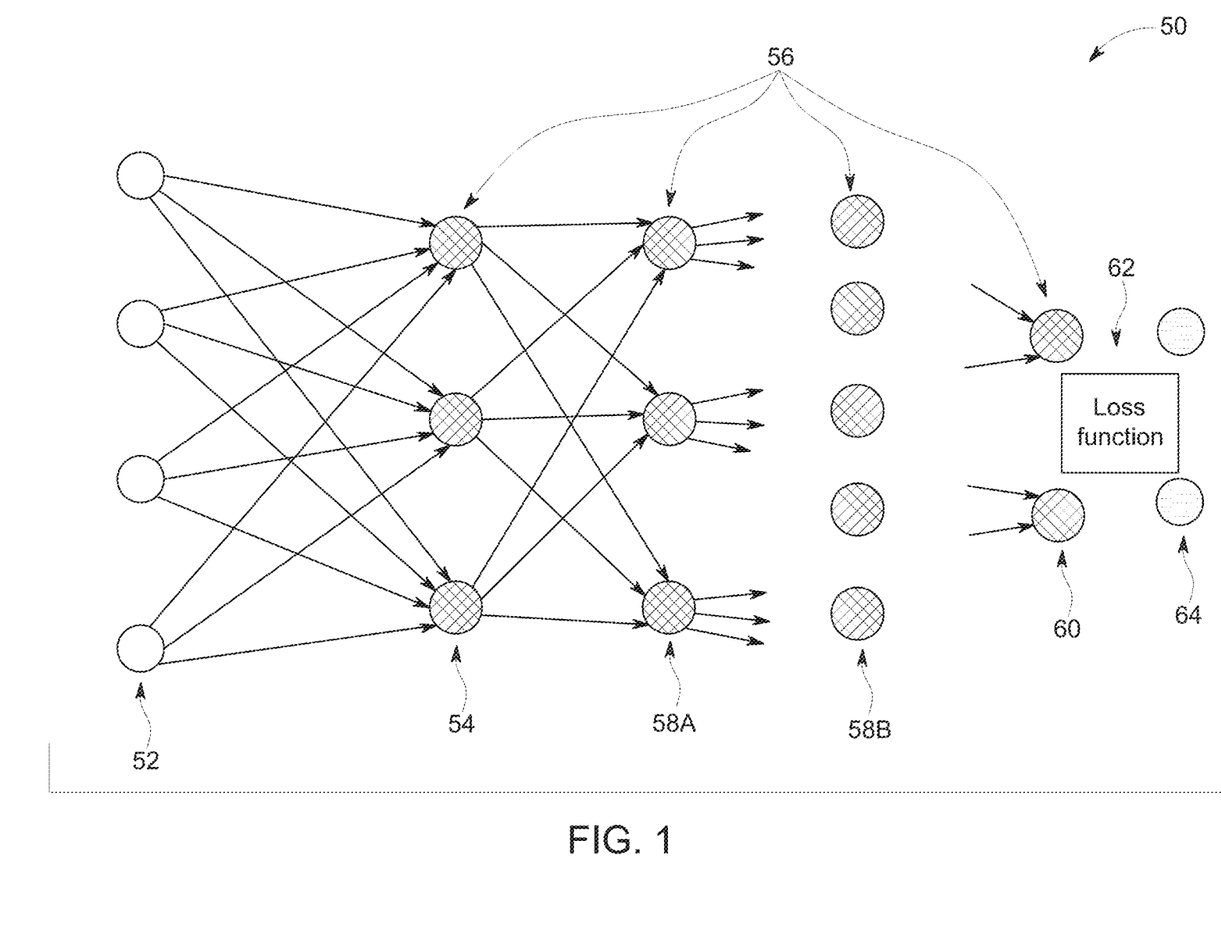
FIG. 1 depicts an example of a machine learning implementation in the form of an artificial neural network, in accordance with aspects of the present disclosure.

With this in mind, FIG. 1 schematically depicts an example of an artificial neural network 50 that may be trained for machine-learning based image reconstruction as discussed herein. In this example, the network 50 is multi-layered, and is shown with a training input 52 and multiple layers including an input layer 54, hidden layers 58A, 58B, and so forth, and an output layer 60 as well as a training target 64. Each layer, in this example, is composed of a plurality of "neurons" or nodes 56. The number of neurons 56 may be constant between layers or, as depicted, may vary from layer to layer. Neurons 56 at each layer generate respective outputs that serve as inputs to the neurons 56 of the next hierarchical layer. In certain implementations, a weighted sum of the inputs with an added bias is computed to "excite" or "activate" each respective neuron of the layers according to an activation function, such as rectified linear unit (ReLU), sigmoid function, hyperbolic tangent function, or otherwise specified or programmed. The outputs of the final layer constitute the network output 60 (e.g., a transformed or residual image) which, in conjunction with a target image 64, are used to compute some loss or error function 62, which will be backpropagated to guide the network training.

The loss or error function 62 measures the difference between the network output 60 and the training target 64. In certain implementations, the loss function may be the mean squared error (MSE) of the voxel-level values or partial-line-integral values and/or may account for differences involving other image features, such as image gradients or other image statistics. Alternatively, the loss function 62 could be defined by other metrics associated with the particular task in question, such as a softmax function.

To facilitate explanation of the present tomographic reconstruction approach using machine learning techniques, the present disclosure primarily discusses these approaches in the context of a CT or C-arm system. However, it should be understood that the following discussion may also be applicable to other image modalities and systems including, but not limited to, PET, SPECT, multi-spectral CT, phase-contrast imaging, and MRI, as well as to non-medical contexts or any context where tomographic reconstruction is employed to reconstruct an image.

Figure 2:
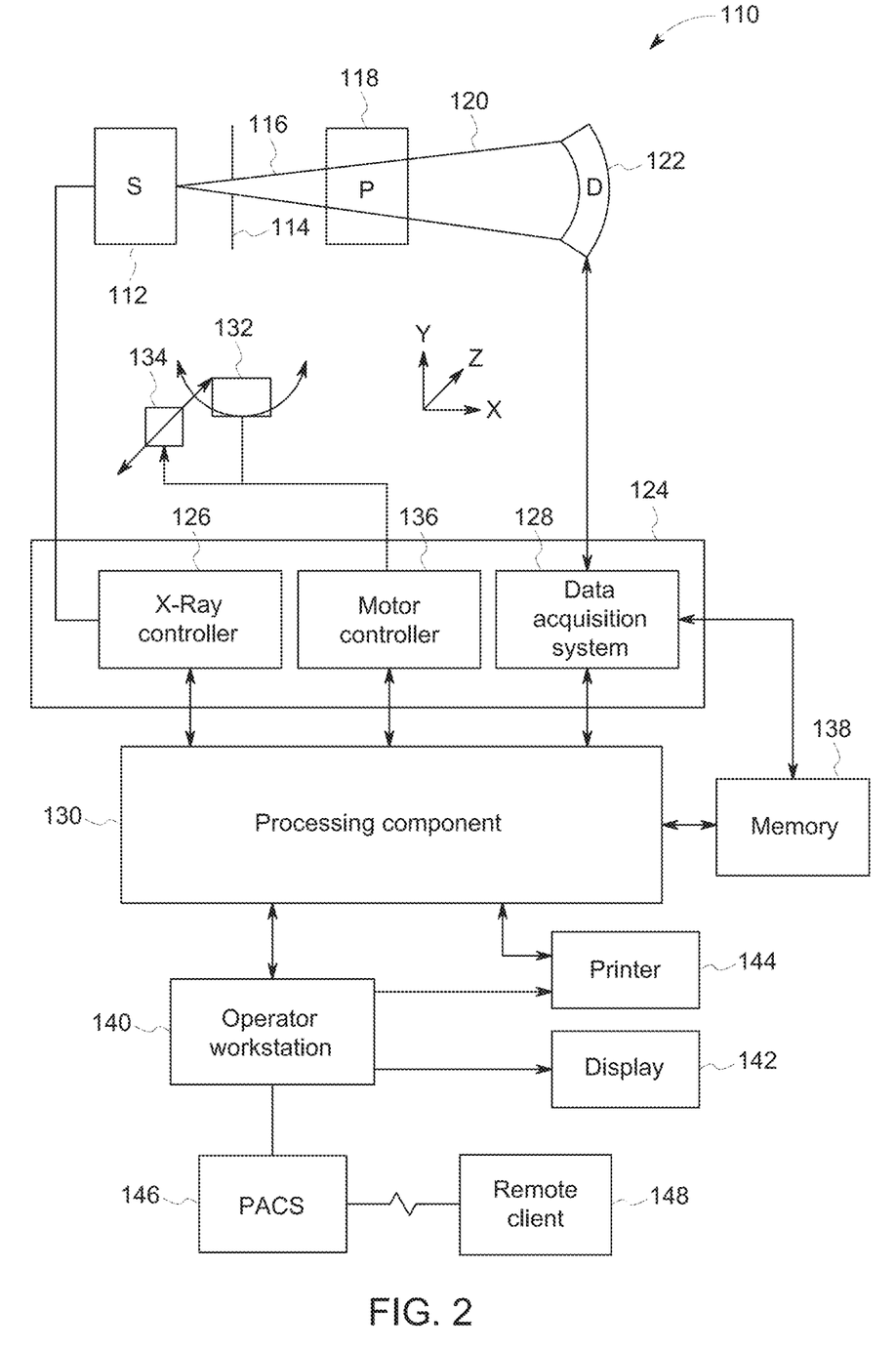
FIG. 2 is a block diagram depicting components of a computed tomography (CT) imaging system, in accordance with aspects of the present disclosure.

With this in mind, an example of an imaging system 110 (i.e., a scanner) is depicted in FIG. 2. In the depicted example, the imaging system 110 is a CT imaging system designed to acquire scan data (e.g., X-ray attenuation data) at a variety of views around a patient (or other subject or object of interest) and suitable for performing image reconstruction using tomographic reconstruction techniques. In the embodiment illustrated in FIG. 2, imaging system 110 includes a source of X-ray radiation 112 positioned adjacent to a collimator 114. The X-ray source 112 may be an X-ray tube, a distributed X-ray source (such as a solid-state or thermionic X-ray source) or any other source of X-ray radiation suitable for the acquisition of medical or other images. Conversely, in a PET or SPECT embodiments, a toroidal radiation detector may be provided and a radio-active tracer is used as a radiation source. In the case of MM, the measurements are samples in Fourier space and can either be applied directly as the input to the neural network or can first be converted to line integrals in sinogram space.

In the depicted example, the collimator 114 shapes or limits a beam of X-rays 116 that passes into a region in which a patient/object 118, is positioned. In the depicted example, the X-rays 116 are collimated to be a cone-shaped beam, i.e., a cone-beam, that passes through the imaged volume. A portion of the X-ray radiation 120 passes through or around the patient/object 118 (or other subject of interest) and impacts a detector array, represented generally at reference numeral 122. Detector elements of the array produce electrical signals that represent the intensity of the incident X-rays 120. These signals are acquired and processed to reconstruct images of the features within the patient/object 118.

Source 112 is controlled by a system controller 124, which furnishes both power, and control signals for CT examination sequences, including acquisition of two-dimensional localizer or scout images used to identify anatomy of interest within the patient/object for subsequent scan protocols. In the depicted embodiment, the system controller 124 controls the source 112 via an X-ray controller 126 which may be a component of the system controller 124. In such an embodiment, the X-ray controller 126 may be configured to provide power and timing signals to the X-ray source 112.

Moreover, the detector 122 is coupled to the system controller 124, which controls acquisition of the signals generated in the detector 122. In the depicted embodiment, the system controller 124 acquires the signals generated by the detector using a data acquisition system 128. The data acquisition system 128 receives data collected by readout electronics of the detector 122. The data acquisition system 128 may receive sampled analog signals from the detector 122 and convert the data to digital signals for subsequent processing by a processor 130 discussed below. Alternatively, in other embodiments the digital-to-analog conversion may be performed by circuitry provided on the detector 122 itself. The system controller 124 may also execute various signal processing and filtration functions with regard to the acquired image signals, such as for initial adjustment of dynamic ranges, interleaving of digital image data, and so forth.

In the embodiment illustrated in FIG. 2, system controller 124 is coupled to a rotational subsystem 132 and a linear positioning subsystem 134. The rotational subsystem 132 enables the X-ray source 112, collimator 114 and the detector 122 to be rotated one or multiple turns around the patient/object 118, such as rotated primarily in an x,y-plane about the patient. It should be noted that the rotational subsystem 132 might include a gantry or C-arm upon which the respective X-ray emission and detection components are disposed. Thus, in such an embodiment, the system controller 124 may be utilized to operate the gantry or C-arm.

The linear positioning subsystem 134 may enable the patient/object 118, or more specifically a table supporting the patient, to be displaced within the bore of the CT system 110, such as in the z-direction relative to rotation of the gantry. Thus, the table may be linearly moved (in a continuous or step-wise fashion) within the gantry to generate images of particular areas of the patient 118. In the depicted embodiment, the system controller 124 controls the movement of the rotational subsystem 132 and/or the linear positioning subsystem 134 via a motor controller 136.

In general, system controller 124 commands operation of the imaging system 110 (such as via the operation of the source 112, detector 122, and positioning systems described above) to execute examination protocols and to process acquired data. For example, the system controller 124, via the systems and controllers noted above, may rotate a gantry supporting the source 112 and detector 122 about a subject of interest so that X-ray attenuation data may be obtained at one or more views relative to the subject. In the present context, system controller 124 may also include signal processing circuitry, associated memory circuitry for storing programs and routines executed by the computer (such as routines for performing tomographic reconstruction techniques described herein), as well as configuration parameters, image data, and so forth.

In the depicted embodiment, the image signals acquired and processed by the system controller 124 are provided to a processing component 130 for reconstruction of images in accordance with the presently disclosed algorithms. The processing component 130 may be one or more general or application-specific microprocessors. The data collected by the data acquisition system 128 may be transmitted to the processing component 130 directly or after storage in a memory 138. Any type of memory suitable for storing data might be utilized by such an exemplary system 110. For example, the memory 138 may include one or more optical, magnetic, and/or solid state memory storage structures. Moreover, the memory 138 may be located at the acquisition system site and/or may include remote storage devices for storing data, processing parameters, and/or routines for tomographic image reconstruction, as described below.

The processing component 130 may be configured to receive commands and scanning parameters from an operator via an operator workstation 140, typically equipped with a keyboard and/or other input devices. An operator may control the system 110 via the operator workstation 140. Thus, the operator may observe the reconstructed images and/or otherwise operate the system 110 using the operator workstation 140. For example, a display 142 coupled to the operator workstation 140 may be utilized to observe the reconstructed images and to control imaging. Additionally, the images may also be printed by a printer 144 which may be coupled to the operator workstation 140.

Further, the processing component 130 and operator workstation 140 may be coupled to other output devices, which may include standard or special purpose computer monitors and associated processing circuitry. One or more operator workstations 140 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

It should be further noted that the operator workstation 140 may also be coupled to a picture archiving and communications system (PACS) 146. PACS 146 may in turn be coupled to a remote client 148, radiology department information system (RIS), hospital information system (HIS) or to an internal or external network, so that others at different locations may gain access to the raw or processed image data.

While the preceding discussion has treated the various exemplary components of the imaging system 110 separately, these various components may be provided within a common platform or in interconnected platforms. For example, the processing component 130, memory 138, and operator workstation 140 may be provided collectively as a general or special purpose computer or workstation configured to operate in accordance with the aspects of the present disclosure. In such embodiments, the general or special purpose computer may be provided as a separate component with respect to the data acquisition components of the system 110 or may be provided in a common platform with such components. Likewise, the system controller 124 may be provided as part of such a computer or workstation or as part of a separate system dedicated to image acquisition.

The system of FIG. 2 may be utilized to acquire X-ray projection data (or other scan data for other modalities) for a variety of views about a region of interest of a patient to reconstruct images of the imaged region using the scan data. Projection (or other) data acquired by a system such as the imaging system 110 may be reconstructed as discussed herein to perform a tomographic reconstruction. In particular, the present approach utilizes machine learning techniques for tomographic reconstruction of images.

With the preceding in mind, the present approach employs machine or deep learning techniques to transform a tomographic image of a subject generated using routines that are not computationally intensive into an image equivalent to what would be obtained on the same scan date using a target reconstruction algorithm that is computationally intensive.

The deep learning network 50 is trained specifically from image pairs (or a higher number of images) reconstructed from the same set of tomographic scan data from the object. In an example, a convolutional neural network (CNN) is trained from filtered backprojected (FBP) and MBIR reconstructions generated from the same scan data. The trained neural network 50 generates a function that maps a first image reconstructed using analytic or direct reconstruction approaches (e.g., FBP) to a second image corresponding to an iterative-based reconstruction (e.g., an MBIR image). The trained neural network 50 may then be applied to any image generated using the analytic reconstruction approach to produce an iterative-reconstruction equivalent image. The iterative-reconstruction equivalent image, however, may be generated much faster than a true iteratively reconstructed image could be reconstructed directly from the same tomographic scan data, and/or with better overall characteristics such as texture, artifacts, and so forth, since the output is conditioned by the initial analytically reconstructed image. As may be appreciated, the present approach can be generalized beyond FBP and MBIR to any desired target behavior for the output of the processing with benefits relative to the first image that is fed to the trained network 50.

As discussed herein, certain aspects of training machine learning or deep neural networks that may be relevant to the present approach include residual learning, convolutional neural networks, and batch normalization. These concepts are instrumental in the effective training of the deep learning network and are presently discussed to provide context to the present approach.

With respect to residual learning, this aspect relates to the relationship between the depth of a neural networks (i.e., number of layers) and the network's performance with respect to deep learning, with greater depth typically being associated with greater performance. However, training very deep neural networks may be challenging for various reasons. Residual learning as discussed herein, is an approach that may be more suitable for neural network training where residual functions are learned by the network 50 instead of learning the unreferenced target functions.

By way of example, suppose a noisy observation $y=x+v$ is obtained. A conventional deep learning approach may attempt tries to find a non-linear mapping for latent target image $F(y)=x$. In a residual learning context, however, a residual mapping $R(y)=v$, $x \approx y - R(y)$ is instead found. The following cost function may then be optimized to estimate the weight parameters in deep neural networks given the training dataset $\{(y_i, x_i)\}_{i=1}^{N}$.

$$l(\theta) = \frac{1}{2N} \sum_{i=1}^{N} \|R(y_i, \theta) - (y_i - x_i)\|_F^2 \quad (2)$$

With a residual learning approach, the low-frequency parts of the image can be bypassed and the network only learns the high-frequency characteristics, thereby reducing the dimensions of the learning problem. Unlike conventional residual learning approaches, which reconstruct the original image using complex network architecture, such as identity shortcuts, using the present machine learning approach the residual image can be predicted using a direct optimization via application of a trained neural network.

With respect to convolutional neural networks (CNN), the above mapping function R may, in one implementation, consist of multiple convolutional and neuron activation layers 58. In each layer 58, the activation function $f$ is found with convolution:

$$g=f(Wy+b) \qquad (3)$$

where W is the convolution matrix and b is a bias in neural activation. In conventional approaches the activation function model is a sigmoid (e.g. $f(a)-(1+e^{-a})^{-1}$) which may be susceptible to vanishing gradient problems in optimizing very deep neural networks. With this in mind, in certain implementations rectified linear units (ReLU) are used where:

$$f(a)=\max(0,a). \qquad (4)$$

Since the use of ReLU preserves the positive input in neuron activation, vanishing gradients in many layers of the neural network can be avoided.

With respect to batch normalization, mini-batch stochastic gradient descent is often used to optimize the cost function in deep learning due to efficient training. However, internal covariate shift issues (e.g. changes of the distribution of internal input for each neural activation) may slow the convergence speed of optimization in such approaches. In accordance with certain implementations, batch normalization is employed instead to address the internal covariate shift problem and allow for faster training.

Specifically, an additional layer is added between convolution and neuron activation layers. The additional layer incorporates a normalization step for the mean and variance of internal input to the neuron activation layer. In accordance with this approach, two additional parameters (corresponding to mean and variance) per layer need to be estimated, but the convergence speed of mini-batch stochastic gradient descent is significantly accelerated.

With the preceding in mind, the present approach incorporates one or more of residual learning, convolutional neural networks, and/or batch normalization to implement a deep learning network, or other suitable machine learning approach, configured to receive or process an input image corresponding to an analytic or direct reconstruction (e.g., an FBP reconstruction) and output an image corresponding to what would generated by reconstructing the same underlying scan data using an iterative reconstruction algorithm (e.g., an MBIR reconstruction) and/or an image corresponding to the residual or difference between the analytic or direct reconstruction and such an iterative reconstruction.

Figure 3:
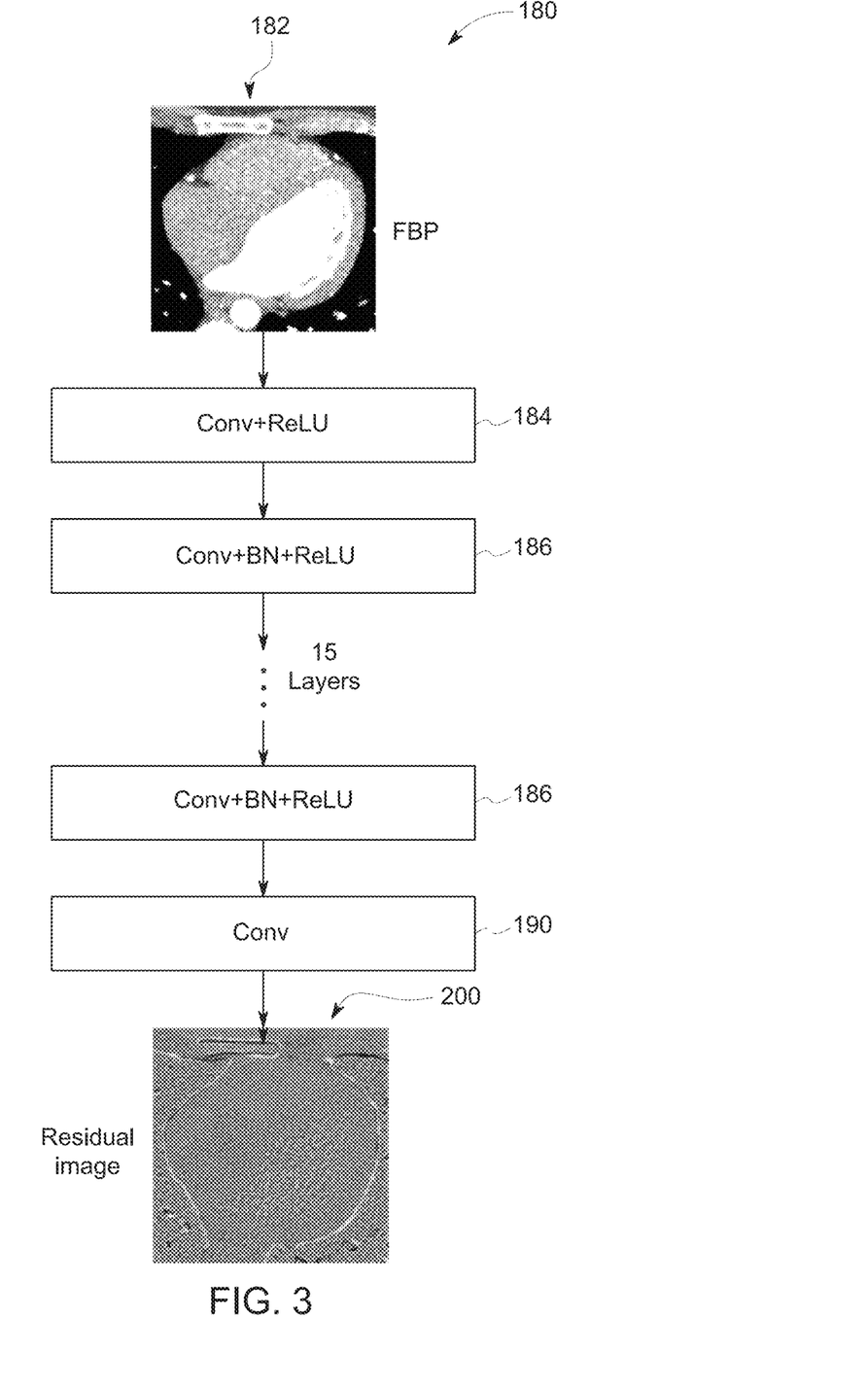
FIG. 3 depicts a network architecture for reconstructing images, in accordance with aspects of the present disclosure.

By way of example, and turning to FIG. 3, a network architecture 180 is depicted for implementing this approach. The network architecture receives as an input an image 182 that is a direct or analytic reconstruction. In the depicted example, three different network units or aspects are shown. In a first unit (denoted by reference number 184) 64 filters of 3×3 convolution kernels followed by rectified linear units (ReLU) are provided. In a second unit (denoted by reference number 186) 64 filters of 3×3×64 kernel with batch normalization and ReLU are provided. The second unit 186 is repeated multiple times (such as fifteen times) to create the deep neural network. Finally, at the third unit (denoted by reference number 190) the final image, here a residual image 200, is reconstructed with (de)-convolution with 1 filter of 3×3×64 kernel. As noted above, such a residual image 200 may correspond to the difference between an input image 182 created by analytic reconstruction (e.g., FBP) of the scan data) and an image that would result from iterative reconstruction (e.g., MBIR) of the same scan data. It may be noted that the residual image 200 is directly predicted or estimated from the input image 182, and not from reconstruction of the scan data itself.

As may be appreciated, the use of a convolution neural network with multiple layers that uses residual learning and includes convolutional layers, rectified linear units, and batch normalization is an example which can be expanded to other suitable designs of machine learning algorithms.

Figure 4:
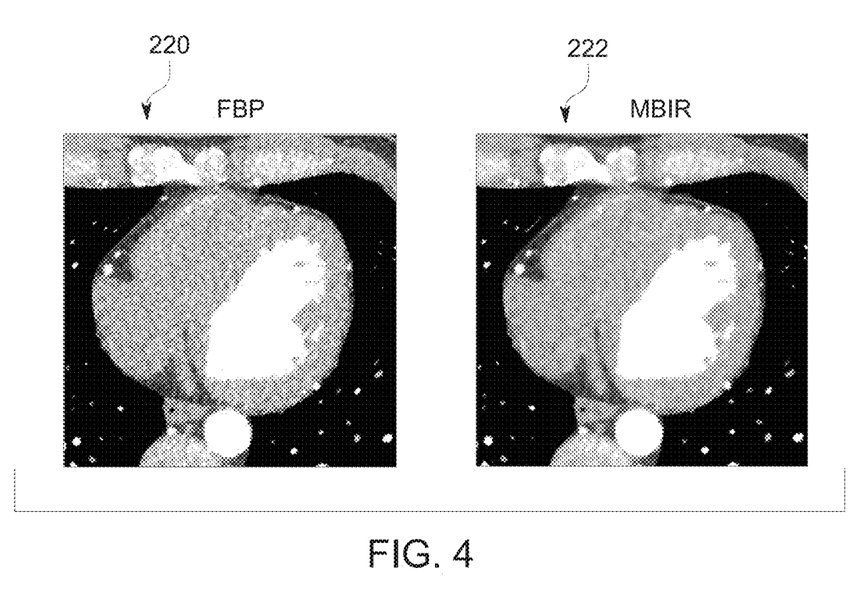
FIG. 4 depicts a pair of training images, in accordance with aspects of the present disclosure.

With the preceding in mind, the following examples are provided to facilitate explanation of training and use of the present approach. In one example, a deep neural network is trained to learn the relation between FBP-type and MBIR-type reconstructions produced from the same set of tomographic cardiac data. FIG. 4 shows an example of the training dataset, with an FBP image 220 and an MBIR image 222. In this example, the two volumes were reconstructed (FBP-type: adaptive statistical iterative reconstruction (ASIR)-V 70%, and MBIR-type: VEO) from the same projection data. Each volume consists of 256 slices of 512×512 images, one of which is shown. It may be noted, and can be observed in the depicted examples, that FBP is susceptible to noisy texture, particularly inside the soft tissue when tomographic data is acquired at low dose, whereas MBIR greatly reduces the noise relative to FBP while improving spatial resolution. In this example, 40×40 pixel patches are extracted in image pairs with stride 20 and random permutations to create the training database. The training data is then used to train a neural network as discussed herein.

Figure 5:
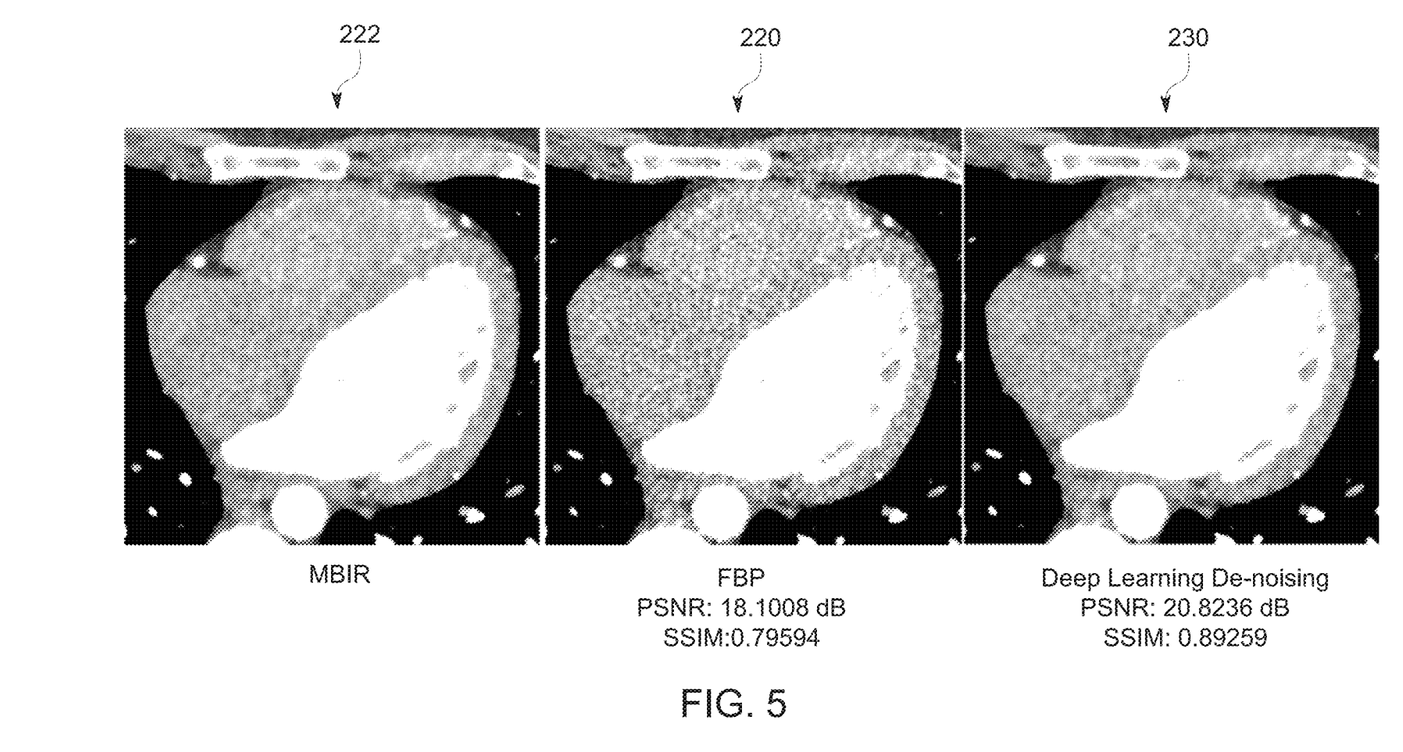
FIG. 5 depicts a first example of target, input, and output images, in accordance with aspects of the present disclosure.
Figure 6:
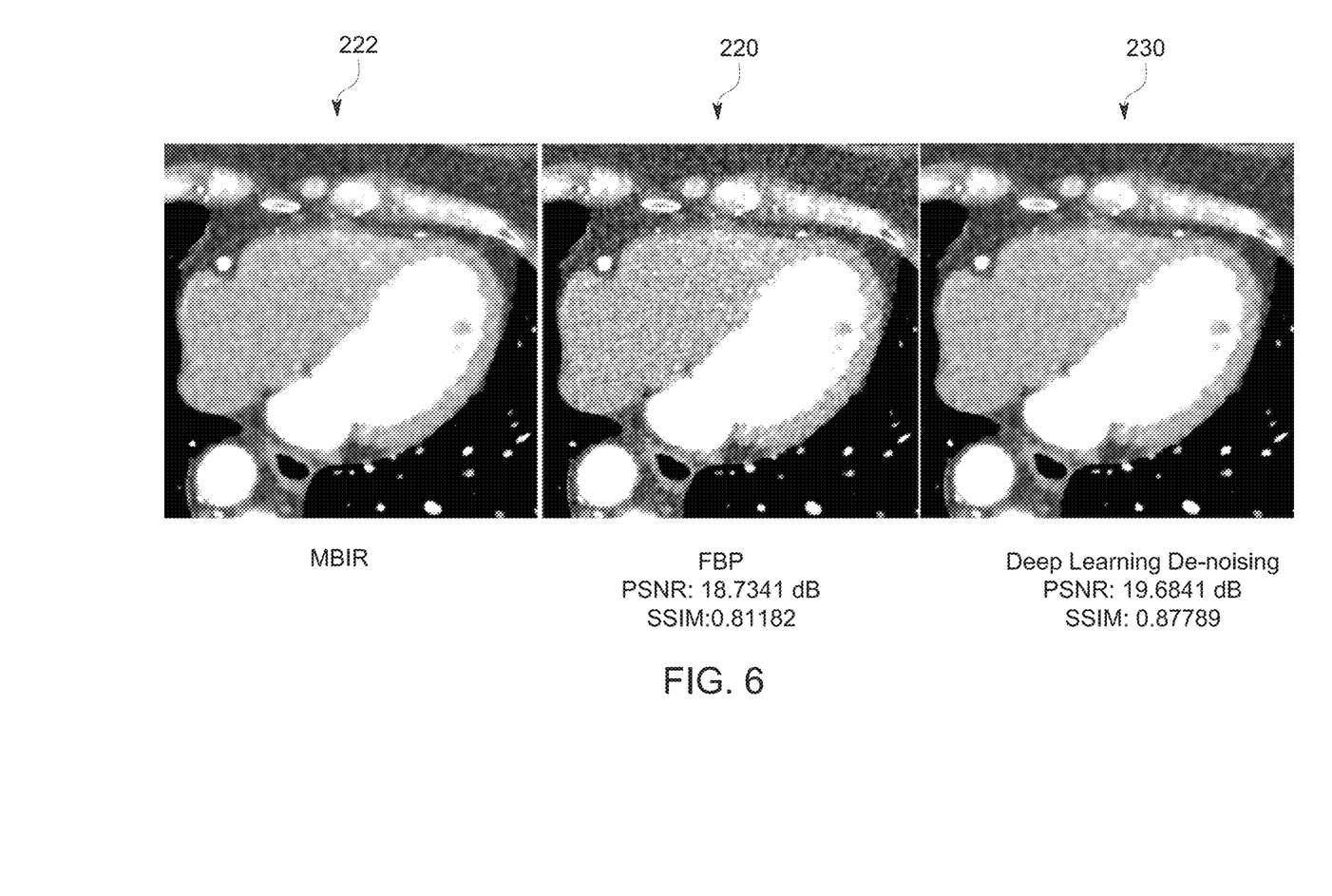
FIG. 6 depicts a second example of target, input, and output images, in accordance with aspects of the present disclosure.
Figure 7:
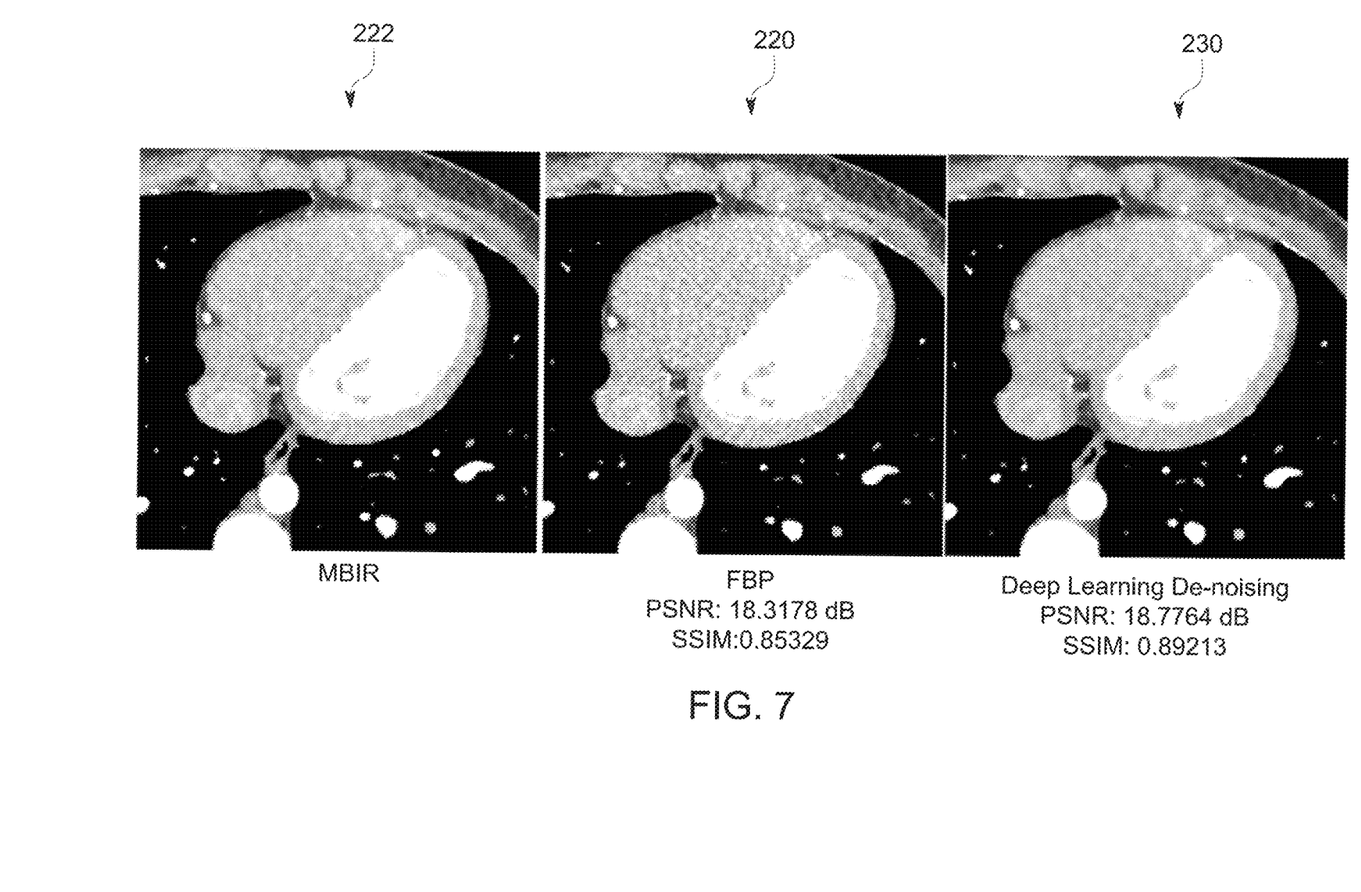
FIG. 7 depicts a third example of target, input, and output images, in accordance with aspects of the present disclosure.

The trained deep network may be employed to remove noise and improve FBP-type images generated from other sets of tomographic cardiac scan data. By way of example, FIGS. 5-7 illustrate image results emulating the look and feel of a target MBIR image 222 using deep learning processing of an FBP image 220 where the FBP image 220 is processed using a residual image (such as by subtracting the residual or noise image from the FBP image 220) to generate a de-noised image 230 that corresponds to an MBIR image reconstructed from the original projection data. The output image may then be displayed for review by a clinician.

For reference, the target, i.e., ground truth, MBIR reconstruction image 222 is displayed along with the unprocessed FBP image 220. For all three examples shown in FIGS. 5-7, deep learning results show improvement in image quality, generating MBIR-like image quality with reduced noise in the soft tissue and enhanced spatial resolution around feature boundaries. Quantitatively, about 1 dB increase in peak signal to noise ratio (PSNR) and 10% increase in structural similarity (SSIM) is achieved compared with standard FBP. In a prototype implementation, these results were produced on a GPU-based implementation in approximately 10 ms/slice. By comparison, reconstructing the target MBIR image itself takes several minutes, on an advanced practical computation platform.

As may be appreciated, FBP-type and MBIR-type images are discussed herein solely as suitable examples, but any combination of images that would be generated from the same set of tomographic scan data may benefit from the present approach. For example, in general the present approach may be suitable where a first image is generated from a generally simple or direct reconstruction and a second (or target) image includes desired characteristics (e.g., lack of noise, desired texture, and so forth) that differ from what is seen in the first image and which would typically be achieved by a different reconstruction of the same base data or an additional processing step. By way of example, an FBP-type image as used herein may refer to a simple FBP, or adaptive statistical iterative reconstruction (ASiR) or ASiR-V reconstruction. Similarly, the target image may be an image that exhibits the traditional noise reduction and resolution improvement that MBIR/Veo provides over FBP. Similarly, the target image could be ASiR-V or some other image having good texture characteristics.

As may be appreciated the present concepts can be generalized to encompass other base and target image contexts in addition to those provided as examples above. For instance, the present approach may encompass the generation of target images exhibiting artifact correction, such as where the first image is an FBP image with metal artifacts and the target image is the same image where a dedicated metal artifact reduction (MAR) algorithm is applied. Similarly, the present approach may encompass the correction of motion artifacts, such as where the first image is an FBP image with motion artifacts and the target image is the same image where a motion correction algorithm is applied. Likewise, the present approach may be employed to address truncated dataset issues or artifacts, such as by employing a first image that is an FBP generated from a truncated dataset where the target image is the same reconstruction where an extended field of view algorithm has been applied. Similarly, the first image could be an FBP of a set of limited angle projections and the target image could correspond to a sparse-view reconstruction of the same dataset. Thus, as may be appreciated from these examples, the present approach is suitable for where a first or input image is generated by a simple or direct reconstruction of a scan data set and the target image corresponds to a more computationally intensive reconstruction or correction that would be obtained using the same scan data, but which can be achieved using a trained neural network in substantially less time and/or with less computational cost. The images generated in this manner may then be displayed for review. As shown herein the trained image pairs may include images generated using the simple reconstruction and the computationally intensive reconstruction and generated from the same scan data.

As may be further appreciated, the present approach may be extended to allow for differential handling or treatment of specified image regions. For example, different types of tissue or composition (e.g., bone, contrast, soft tissue, and so forth) may be identified and subjected to processing using different neural networks or some regions may be subjected to further processing by a trained neural network while other regions receive no such processing. For instance, in one implementation an image region identified or segmented as a bone region may be processed with a bone-specific neural network trained to correspond to a bone-specific target algorithm, such as one where high resolution is an objective. In such an approach an FBP with a bone kernel target image may be employed. Similarly, another image region, such as an image region identified or segmented as soft tissue may be processed with a soft tissue-specific neural network trained to correspond to a soft tissue-specific target algorithm, such as one where low noise or some target noise power spectrum (NPS) for texture is an objective. In such an approach, an FBP with soft or standard kernel target image may be employed.

In an implementation of this extension, for a given target model (e.g., tissue type) there is a respective deep learning network (e.g., CNN), and for another target model there would be a different deep learning network. In such an approach, the algorithm may determine what tissue type a given region or image patch (either two-dimensional (2D) or three-dimensional (3D patches) corresponds to (or, alternatively, separately generated segmentation information may be provided to the training and processing). The various tissue type models and processing may be merged into a single large deep learning network to process image and generate target results that are different for different region types or organs.

Technical effects of the invention include training a machine learning algorithm or a neural network using multiple images produced from a single set of tomographic projection data (such as a simple reconstruction and a computationally intensive reconstruction), where one image is the target image that exhibits the desired characteristics for the final result. This is in contrast to prior approaches in which image pairs from at least two different tomographic acquisitions are used, rather than a single acquisition. Technical effects further include use of the trained neural network to generate a final image corresponding to a computationally intensive reconstruction from an input image generated using a direct or analytic reconstruction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for training a machine learning algorithm, comprising:
   accessing projection data, previously not reconstructed, acquired using a tomographic system or systems;
   generating a plurality of image pairs, wherein each image pair comprises a first reconstructed image generated using a first algorithm and a second reconstructed image generated using a second algorithm, wherein for each respective image pair the first algorithm and the second algorithm are applied to the same projection data, and wherein the first algorithm is different from the second algorithm; and
   training the machine learning algorithm to emulate the characteristics of the second algorithm using the plurality of image pairs.

2. The method of claim 1, wherein the second algorithm comprises a target algorithm that is more computationally intensive than the first algorithm.

3. The method of claim 1, further comprising:
   using the trained machine learning algorithm to process images generated using the first algorithm to generate output images having quality characteristics similar to images generated using the second algorithm.

4. The method of claim 1, wherein the projection data comprises computed tomography (CT) projection data, the first algorithm is a first CT reconstruction algorithm, and the second algorithm is a second CT reconstruction algorithm.

5. The method of claim 1, wherein the first algorithm comprises an analytical reconstruction algorithm and the second algorithm comprises a statistical reconstruction algorithm.

6. The method of claim 1, wherein the first algorithm comprises an image reconstruction or image generation algorithm and the second algorithm comprises a correction algorithm.

7. The method of claim 6, wherein the correction algorithm comprises one or more of an artifact correction or reduction algorithm, a noise reduction algorithm, a metal artifact reduction algorithm, a beam hardening artifact reduction algorithm, a partial volume correction algorithm, a low signal correction algorithm, a motion correction algorithm, a truncation correction algorithm, a white pixel correction algorithm, a scatter correction algorithm, an image texture optimization algorithm, a sparse reconstruction correction algorithm, or a spectral calibration algorithm.

8. The method of claim 1, wherein the machine learning algorithm comprises a neural network configured to employ one or more of residual learning, convolutional layers, rectified linear units, or batch normalization.

9. The method of claim 1, further comprising:
breaking each first reconstructed image and second reconstructed image into sets of two-dimensional (2D) or three-dimensional (3D) patches, wherein the machine learning algorithm is trained from each pair of patches to emulate the second algorithm based on a characteristic of the patches.

10. An image processing system, comprising:
a memory storing one or more processor-executable routines; and
a processing component configured to communicate with the memory and execute the one or more processor-executable routines, wherein the one or more processor executable routines, when executed, cause the processing component to:
generate a first reconstructed image by applying a first algorithm to a set of tomographic scan data, previously not reconstructed, or access the first reconstructed image from a storage medium; and
provide the first reconstructed image as an input to a machine learning algorithm trained to generate an output reconstructed image corresponding to application of a second algorithm to the set of tomographic scan data, wherein the first algorithm is different from the second algorithm.

11. The image processing system of claim 10, wherein the second algorithm comprises a target algorithm that is more computationally intensive than the first algorithm.

12. The image processing system of claim 10, wherein the first algorithm comprises an image reconstruction or image generation algorithm and the second algorithm comprises a correction algorithm.

13. The image processing system of claim 12, wherein the correction algorithm comprises one or more of an artifact correction or reduction algorithm, a noise reduction algorithm, a metal artifact reduction algorithm, a beam hardening artifact reduction algorithm, a partial volume correction algorithm, a low signal correction algorithm, a motion correction algorithm, a truncation correction algorithm, a white pixel correction algorithm, a scatter correction algorithm, an image texture optimization algorithm, a sparse reconstruction correction algorithm, or a spectral calibration algorithm.

14. The image processing system of claim 10, wherein the machine learning algorithm is trained to generate the output reconstructed image by calculating a residual image comprising differences that would be observed between images generated from the set of tomographic scan data using the first algorithm and the second algorithm and to modify the first reconstructed image with the residual image to generate the output reconstructed image.

15. The image processing system of claim 10, wherein the first algorithm comprise s an analytical reconstruction algorithm and the second algorithm comprises a statistical reconstruction algorithm.

16. An image reconstruction method, comprising:
generating a first reconstructed image by applying a first algorithm to a set of tomographic scan data, previously not reconstructed, or accessing the first reconstructed image from a storage medium; and
providing the first reconstructed image as an input to a machine learning algorithm trained to generate an output reconstructed image corresponding to application of a second algorithm to the set of tomographic scan data, wherein the first algorithm is different from the second algorithm.

17. The image reconstruction method of claim 16, wherein the second algorithm comprises a target algorithm that is more computationally intensive than the first algorithm.

18. The image reconstruction method of claim 16, wherein the machine learning algorithm is trained to generate the output reconstructed image by calculating a residual image comprising differences that would be observed between images generated from the set of tomographic scan data using the first algorithm and the second algorithm and to modify the first reconstructed image with the residual image to generate the output reconstructed image.

19. The image reconstruction method of claim 16, wherein the first algorithm comprises an analytical reconstruction algorithm and the second algorithm comprises a statistical reconstruction algorithm.

* * * * *